(12) United States Patent
Lenderink

(10) Patent No.: US 6,649,245 B2
(45) Date of Patent: Nov. 18, 2003

(54) FLEXIBLE REAL WOOD COMPOSITION VENEER

(76) Inventor: Thomas A. Lenderink, P.O. Box 310, Belmont, MI (US) 49306

( * ) Notice: Subject to any disclaimer, the term of this patent is extended or adjusted under 35 U.S.C. 154(b) by 91 days.

(21) Appl. No.: 09/822,604

(22) Filed: Mar. 30, 2001

(65) Prior Publication Data

US 2002/0142145 A1 Oct. 3, 2002

(51) Int. Cl.⁷ .......................... B32B 1/10; B32B 21/08; B32B 21/14; B32B 27/04
(52) U.S. Cl. ................... 428/121; 428/119; 428/124; 428/161; 428/165; 428/174; 428/304.4; 428/306.6; 428/308.6; 428/318.4; 428/319.7; 428/337; 428/339; 428/481; 428/507; 428/511; 428/514; 428/537.1; 156/196; 156/212; 156/227; 156/297; 156/308.2; 156/309.9
(58) Field of Search ................. 428/121, 122, 428/124, 161, 165, 119, 304.4, 306.6, 308.8, 318.4, 319.3, 480, 481, 507, 511, 514, 510, 537.1, 174, 332, 337, 339; 156/196, 212, 227, 297, 308.2, 309.9

(56) References Cited

U.S. PATENT DOCUMENTS

| 3,458,391 A | | 7/1969 | Miller |
|---|---|---|---|
| 4,034,132 A | | 7/1977 | Manual |
| 4,250,214 A | | 2/1981 | Broxterman et al. |
| 4,352,925 A | | 10/1982 | Petke et al. |
| 4,554,303 A | | 11/1985 | Petke et al. |
| 5,132,391 A | | 7/1992 | White et al. |
| 5,194,310 A | | 3/1993 | Lenderink |
| 5,234,519 A | * | 8/1993 | Talbot et al. ............... 144/348 |
| 5,423,933 A | | 6/1995 | Horian |
| 5,511,787 A | * | 4/1996 | Baum ......................... 473/329 |
| 5,698,061 A | | 12/1997 | Maag |

FOREIGN PATENT DOCUMENTS

JP          06-031858      *  2/1994

* cited by examiner

*Primary Examiner*—Vivian Chen
(74) *Attorney, Agent, or Firm*—Price, Heneveld, Cooper, DeWitt & Litton

(57) ABSTRACT

A composition veneer that is extremely flexible, foldable and moldable, is provided by impregnating a wood veneer with a plastic film. The veneer has a smooth protective polymer surface without separate and distinguishable layers. As a result, the composition veneers of this invention exhibit moldability and shapeability properties similar to plastic sheeting, but contain natural wood and have the appearance of natural wood.

5 Claims, 3 Drawing Sheets

FLEXIBLE REAL WOOD COMPOSITION VENEER

FIELD OF THE INVENTION

This invention relates to decorative wood veneer products.

BACKGROUND OF THE INVENTION

Wood veneer products are commonly used as decorative surfacing for furniture, interior and exterior components of automobiles, and the like. Typically, fused decorative products for furniture and automotive applications are made by bonding thin sheets of high-quality wood to a core material such as plywood, metal or particleboard. A disadvantage with these types of products is that they exhibit relatively poor flexibility, moldability, foldability, or shapeability, and are not acid-free or photo-safe. In general it is only possible to bend such laminates only slightly and typically only in one direction.

U.S. Pat. No. 5,194,310 describes a micro-thin veneer film of natural wood bonded to and supported by a thin film of a backing material, wherein the film is flexible, strong and capable of multiple flexure without stretching or fatigue. Examples of backing materials include a web of paper, synthetic resin or other suitable, flexible sheet-like material. The micro-thin veneer film has the advantage of providing an extremely flexible sheet-like material that achieves a decorative effect with the use of a minimal quantity of wood, thus reducing cost and increasing the use effectiveness of timber resources. The product is capable of use in substantially the same manner as known heavy-duty paper or plastic products on which there has been printed a simulated wood grain design, thus permitting a natural wood layer to be bent 180° over a fold line without normally producing a visible rupture transverse to the wood grain. The wood veneer is bonded to a polyester backing film using a layer of a suitable pressure-sensitive adhesive or a thermoplastic or a thermosetting plastic.

U.S. Pat. No. 5,423,933 describes a plastic-wood composite created by preparation of the wood surface through heating, drying and crushing of the outer cell layers and a subsequent combining, under heat, of the prepared wood surface with a plastic sheeting coated with a polymeric material. Disclosed examples of an adhesive layer that may be used for bonding the plastic sheeting to the wood veneer include polyester ethylvinyl acetate copolymer, ethylvinyl acetate polymer, methylmethacrylate polymer, acrylic polymer and polyethylene.

U.S. Pat. No. 5,698,061 describes a method of bonding wood materials using a copolyester. The copolyester film is applied to a veneer or core material under heat and pressure or optionally by radio frequency energy. The wooden faced veneers used in the method described in the '061 patent are said to have a thickness of 1/30 inch or thinner, and are said to be especially useful in the production of flat, decorative plywood.

SUMMARY OF THE INVENTION

The present invention, in one aspect provides an ultra-thin "composition veneer" that is extremely flexible such that the wood veneer is foldable and moldable. In accordance with this aspect of the invention, a plastic film is fused directly into a wood veneer having a thickness of from about 0.003 to about 0.01 inch. The result is a composition veneer, in which the plastic film impregnates the wood, leaving not only a smooth protective polymer surface on the wood veneer, but also changing the physical characteristics of both the wood and the plastic film.

The term "composition veneer" is used to capture the integration of the plastic film and the wood veneer, and distinguish from a laminate structure, wherein there are two separate and distinguishable layers. The degree of integration of the plastic film into the wood veneer results in a composition veneer in which the wood and plastic from the film cannot be separated mechanically.

The composition wood veneer can be folded, without breaking, which is extraordinary. It can be molded into a three-dimensionally curved configuration. It can, of course, be used in a conventional manner.

These and other features, advantages and objects of the present invention will be further understood and appreciated by those skilled in the art by reference to the following specification, claims and appended drawings.

DETAILED DESCRIPTION OF PREFERRED EMBODIMENTS

The wood composition veneers of this invention, from which a wide variety of products can be fabricated, is a composition which is capable of use in substantially the same manner as known heavy-duty paper or plastic products on which there has been printed a simulated wood grain design. It can also be bent, permitting a natural wood layer to be bent as much as 360° over a fold line without normally producing a visible rupture transverse to the wood grain. The natural wood composition veneers of this invention can also be shaped or molded to form three-dimensional objects, or to conform to the shape of substrate surfaces, such as furniture surfaces, having compound curvature, i.e. curvature with respect to at least two perpendicular planes. The real wood composition veneers of this invention can also be embossed and/or debossed without cracking, fragmenting, or otherwise being visibly damaged.

Figure 1A:
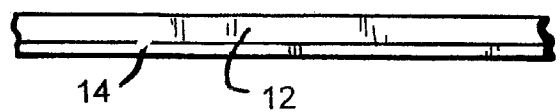
FIG. 1A is a cross section showing the components comprising the composition veneers of this invention.

In accordance with an embodiment of the invention, FIG. 1A schematically illustrates the components of the composition veneer prior to impregnation of the plastic film into the wood veneer. Wood veneer 12 has a thickness of from about 0.003-inch to about 0.01-inch. Rather than being bonded to the veneer, plastic sheet 14 having a thickness of 0.001 inch to about 0.005 inches is impregnated into wood veneer 12. The plastic sheet 14 penetrates through the surface of the wood veneer and into the body of the wood veneer. Accordingly, the resulting composition veneer does not have distinguishable layers, but instead may be viewed as a composite comprising interpenetrating wood domains and plastic domains.

Figure 1B:
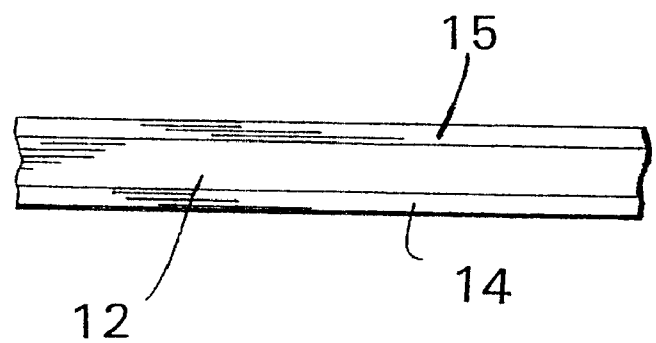
FIG. 1B is a cross section showing the components comprising an alternative composition veneer of this invention.

In accordance with another embodiment of the invention, FIG. 1B schematically illustrates the components of a real wood composition veneer prior to impregnation of two plastic films into the wood veneer from each of the opposing sides of the wood veneer. The components include a wood veneer 12 having a thickness of from about 0.003 inch to about 0.01 inch impregnated with a plastic sheet 14 from one side, and impregnated with a plastic sheet 15 from the opposite side. Plastic sheets 14 and 15 are impregnated into the wood veneer 12 without an adhesive.

A suitable material for plastic sheet 14 is a copolyester of terephthalic acid and a diol. The copolyester may contain repeat units from at least 90 mole percent terephthalic acid, 30 to 50 mole percent diethylene glycol, and 70 to 50 mole percent ethylene glycol, based on 100 mole percent dicarboxylic acid and 100 mole percent diol. The dicarboxylic acid component of the copolyester may optionally be modified with up to 10 mole percent of one or more different dicarboxylic acids other than terephthalic acid or suitable synthetic equivalents such as dimethyl terethphalate. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. The corresponding acid anhyrides, esters and acid chlorides of these acids may also be used. The copolyesters may be prepared from one or more the above dicarboxylic acids.

The copolyester may optionally be modified with up to 5 mole percent of one or more different diols other than ethylene glycol and diethylene glycol. Such additional diols include cycloaliphatic diols preferably having 6 to 20 carbon atoms or aliphatic diols preferably having 3 to 20 carbon atoms. Examples of such diols to be included with ethylene glycol and diethylene glycol are triethylene glycol, 1,4-cyclohexanedimethanol, propane-1,3-diol, butane1,4-diol, pentane-1,5-diol, hexane-1,6-diol, 3-methylpenanediol-(2,4), 2-methylpentanediol-(1,4), 2,2,4-trimethylpentanediol-(1,3), 2-ethylhexanediol-(1,3), 2,2 diethylpropanediol-(1,3), hexanediol-(1,3), 1,4-di(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxy-phenyl)-propane, and 2,2-bis-(4-hydroxypropoxyphenyl)-propane. Two or more of the above diols may be used.

Copolyesters containing substantially only diethylene glycol, ethylene glycol, and terephthalic acid are preferred. Preferably, the diol portion of the copolyester contains 32 to 40 mole percent diethylene glycol, more preferably 36 to 38 percent diethylene glycol, and 68 to 60 mole percent, and more preferably 62 to 64 mole percent ethylene glycol.

The copolyesters of the present invention are commercially available and can be prepared by conventional polycondensation procedures well known in the art. Such processes include direct condensation of the dicarboxylic acid (s) with the diols or by ester interchange using a dialkyl dicarboxylate. For example, dimethyl terephthalate is ester interchanged with the diols at elevated temperatures in the presence of a catalyst. Typical polyesterification catalysts which may be used include titanium alkoxides, dibutyl tin dilaurate and combinations of zinc, manganese or magnesium acetates or benzoates with antimony oxides or antimony triacetate. The copolyesters may also be subjected to solid states polymerization methods.

Many other ingredients can be added to the copolyesters to enhance the performance properties thereof. For example, antioxidants, denesting agents, antiblocking agents, metal deactivators, colorants, phosphate stabilizers, mold release agents, fillers such as talc and formica, silica, glass beads, glass fibers, nucleating agents, ultraviolet light and heat stabilizers, lubricants, flame retardants and the like can be included as additives in the copolyesters. All of these additives and the use thereof are well known in the art. Any of these compounds can be used as long as they do not deleteriously effect the physical, mechanical or adhesive properties of the copolyesters.

Other suitable plastic films include ethylene vinyl acetate (EVA) copolymer film that will not shrink, or swell and which provide superior strength (e.g., approximate 195° F. shear adhesive failure temperature) and a 208° F. ring and ball temperature. An exemplary thickness for the plastic film is from about 0.001 inch to about 0.005 inch. A commercially available product that may be used to form film 14, and optionally film 15, is a copolyester sheet material sold by Lenderink Technologies, Inc., Belmont, Mich., under the name DRYBOND® dry film adhesive.

Substantially any wood may be used to prepare the veneer 12. Dense hard woods such as beech, sugar maple, white, yellow or gray birch are particularly suitable for the manufacture of wood composition veneers in accordance with this invention. However, softer woods, such as cedar and basswood, can also be used. In many cases, wood composition veneers in accordance with this invention can exhibit excellent foldability and moldability or shapeability using a natural wood veneer having a thickness of from about 0.003 inch to about 0.01 inch.

The real wood composition veneer may be prepared by impregnating a plastic sheet 14 into one side or both sides of wood veneer 12 under heat and pressure. Suitable temperatures for impregnating wood veneer 12 with plastic sheet 14, and optionally with plastic sheet 15, are from about 200° to about 210° F. A suitable pressure depends on the type of wood being used. However, pressures of from about 60 psi to about 150 psi are appropriate in most cases. The amount of time during which film 14 and optionally film 15, are pressed into wood veneer 12 under application of heat depends on the type of wood and on the thickness of the wood. However, suitable times are from about 3 minutes to about 15 minutes.

Prior to impregnating the film or films 14–15 into wood veneer 12, the wood veneer should be dried and pressed at about 100 psi and about 220° F.

Figure 2:
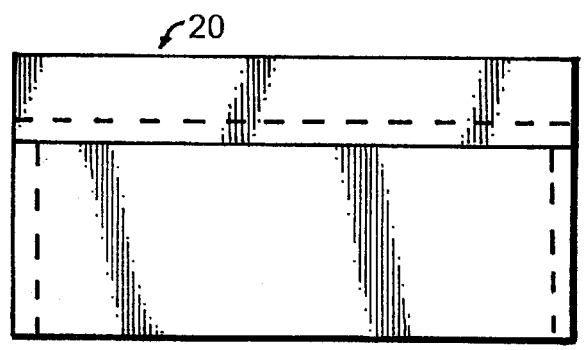
FIG. 2 illustrates an envelope made from a composition veneer of this invention.
Figure 3:
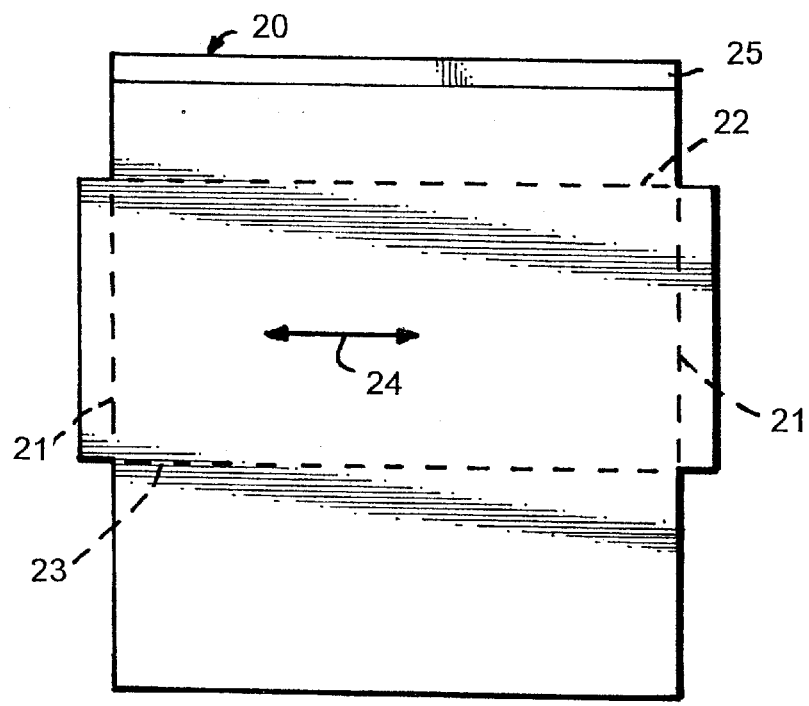
FIG. 3 shows a blank used for fabricating the envelope shown in FIG. 2.

The natural wood composition veneers of this invention have a variety of applications. For example, the composition veneers may be used as printing paper for automated printing and copying equipment. When used as stationery, the natural wood composition veneers can be folded and placed in an envelope 20, which may itself be made of the natural wood composition veneer, as shown in FIG. 2. Envelope 20 can be fabricated from a blank shown in FIG. 3 by folding along lines 21, 22, and 23. Envelope 20 can be sealed in a conventional manner such as with a moisture-activated adhesive 25, a heat stamp, or a pressure sensitive adhesive.

The stationery incorporating this invention can be used in a conventional typewriter, machines utilizing xerographic imagery production, ink jet and laser image producing machines, and high-speed printing machines, since the composition veneer will lay flat and may have a highly ink-receptive surface.

Other uses for the natural wood composition veneers of this invention include crafts, window blinds, vertical louvers, pleated window shades, business cards, point-of-purchase displays, book covers, menu covers, automotive interior dash applications, picture frames mats, furniture, tags, greeting cards, baseball cards, scrapbook pages, photo albums, laminates to building structures such as drop ceiling runners, inlays, translucent inserts, dishes, trays, etc.

The natural wood composition veneers of this invention have advantages in many of the above applications because of their light weight and low cost. A further advantage is that various articles can be fabricated from the composition veneers, or decorated with the composition veneers without any finishing steps, e.g., without sanding or coating steps. In other words, the composition veneers are pre-finished and eliminate or at least substantially reduce the need for steps that involve exposure to volatile organic compounds and/or dust, and drying time. In addition, the real wood composition veneers of this invention do not shrink or swell, and lay perfectly flat. These properties are important, and allow the composition veneers to be used in various applications in which real wood veneers have not been previously used.

The above-referenced copolyesters have received FDA approval for contact with food products. Accordingly, the natural wood composition veneers of this invention may be used for fabricating food containers. Also, because the real wood composition veneers of this invention do not contain any acids or other materials that would accelerate deterioration, the composition veneers are suitable for archival purposes.

Figure 4:
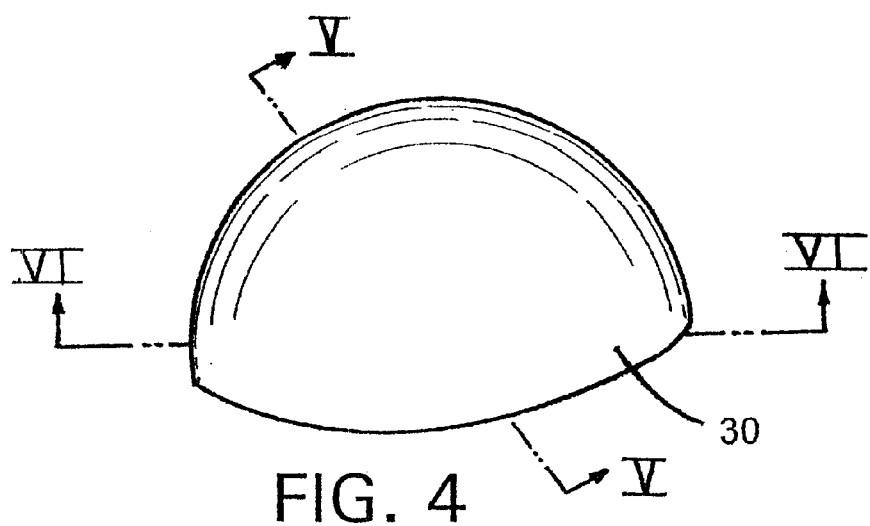
FIG. 4 is a perspective view of a hemispherical object having a decorative overlay molded from a composition veneer of this invention.
Figure 5:
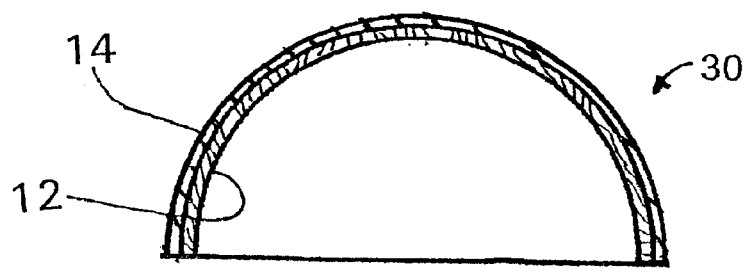
FIG. 5 is a cross-sectional view of the hemispherical object shown in FIG. 4, viewed along lines V—V of FIG. 4.
Figure 6:
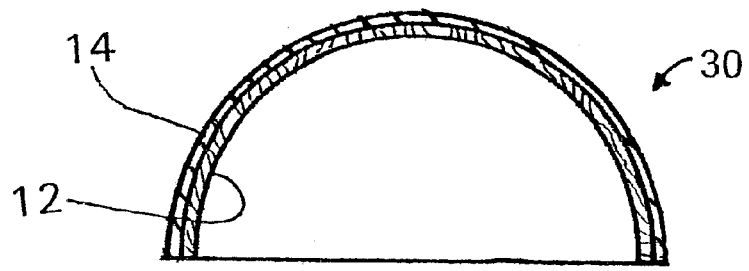
FIG. 6 is a cross-sectional view of the hemispherical object shown in FIG. 4, viewed along lines VI—VI of FIG. 4.

An important characteristic of the composition veneers of this invention is their ability to be shaped or molded. Many three-dimensional articles can be formed by heating a composition veneer with hot air, such as from a blow-dryer (for as little as about 10 seconds), and shaping the heated composition veneer before it cools down. The composition veneers of this invention can be placed in a molding or shaping tool and made to conform with the shape of the mold or tool. While there may be limitations to the extent to which the laminates of this invention may be shaped, they exhibit a very high degree of shapeability or moldability as compared with known materials having a natural wood veneer layer. For example, the composition veneers of this invention can be shaped, such as under application of heat and pressure, into a three-dimensional molded or shaped object having curvature with respect to at least two perpendicular planes. This is illustrated in FIGS. 4–6, which show a hemispherical article 30 comprised of a shaped or molded composition veneer, and a hemispherical-shaped article 30 having a substrate surface to which the shaped composition veneer is fused. As shown in FIGS. 5 and 6, the hemispherical object 30 exhibits curvature with respect to two perpendicular planes (represented by view lines V—V and VI—VI in FIG. 4, with the perpendicular cross-sectional views shown in FIGS. 5 and 6).

Figure 7:
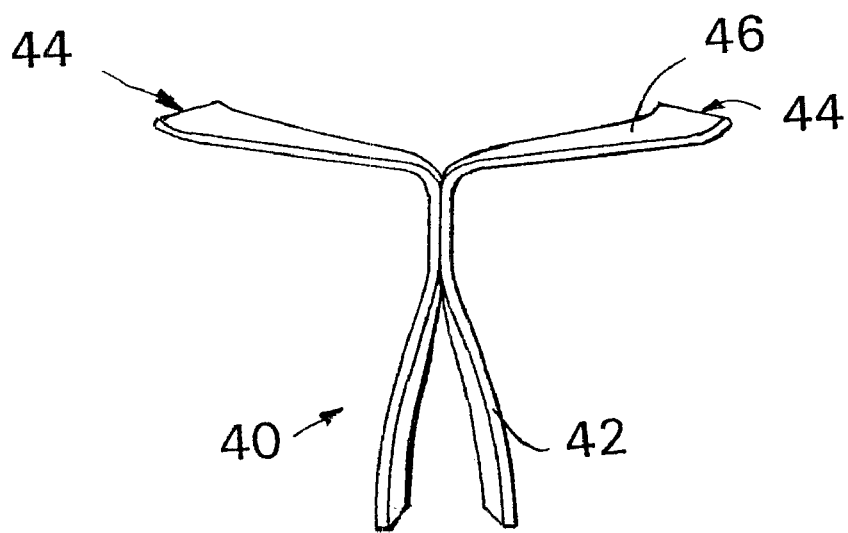
FIG. 7 is a perspective view of a three dimensional object shaped from a composition veneer of this invention.

FIG. 7 shows a pedestal 40 illustrating the complex shapes into which wood composition veneer 12 can be molded. Opposed veneer sheets are shaped to form a base 42 and wings 44 having a highly complex shape including both concave and convex curves. The composition veneer can be easily bent into such complex shapes upon heating above the glass transition temperature and can be held in the desired complex shape upon cooling.

In accordance with particular aspects of this invention, the plastic film layer 14 may include colorants or tinting agents that provide a transparent, tinted finish over the displayed surfaces of the composition veneers, such that the natural wood grain is clearly visible, but is provided with a desired tint or hue.

For certain applications, such as outdoor applications, it will be desirable to add ultraviolet stabilizers to the film layer 14 to improve the resistance of the composition veneers to degradation upon exposure to ultraviolet light. Further, in certain applications, it may be desirable to add a fire retardant to the plastic film layer 14.

On account of the thinness of the natural wood veneer 12, and the transparency of the plastic film layer 14, the composition veneer of this invention will allow a significant amount of light to pass through. Accordingly, interesting applications for the invention include natural wood light diffusers, light panels, lampshades, candle luminaries, partitions and screens.

In addition to being shapeable in a heated mold, the composition veneers of this invention can be shaped or formed using cold continuous rolling operations.

The composition veneers of this invention can be easily cut, punched, stamped, and/or embossed as desired, and can be easily heat fused to surfaces using ultra sonic or spot fusion techniques, either with or without an added adhesive.

The real wood composition veneers of this invention have various uses in the craft industry, specialty packing industry, and printing industry. Specific applications include scrap books, photo albums, place mats, floor mats, decorative appliques, as well as conventional uses of traditional wood veneer products, such as for furniture and automotive applications. The composition veneers fabricated from plastic sheets 14, 15 impregnated into opposite sides of wood veneer 12 are especially useful for applications in which acid-free and/or photo-safe products are required. For example, the composition veneers derived from veneer 12 and plastic sheets 14, 15 are well suited for archival applications, whereas conventional wood veneer laminates are unsuitable. An important advantage of the invention is that it allows large sheets of real wood to be used in high speed automated printing equipment. Another important advantage of the product is that the wood will not shrink or swell on account of changes in the air humidity. Most wood products will swell and/or shrink in response to humidity changes. Many of the advantages of the present invention are attributable to a combination of an ultra thin wood veneer working with water proof resin layers. Another important property of the composition veneers of this invention is that they can be easily embossed and debossed.

The composition veneers of this invention can be attached to various substrates without an added adhesive by heating the composition veneer to a temperature above the glass transition temperature of the plastic impregnating the wood veneer, and pressing the composition veneer against a substrate surface with the heated plastic layer facing the substrate surface, while the plastic in the composition veneer is at a temperature above its glass transition temperature.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A wood composition veneer consisting essentially of:
   a wood veneer having a thickness of from about 0.003 inch to about 0.01 inch and defining a decorative surface on one side thereof;
   a plastic film impregnated into at least said one side of the wood veneer; and wherein:
   the plastic film is an ethylene vinyl acetate copolymer.

2. A decorative folded article comprising:
   a natural wood composition veneer including a natural wood veneer and a plastic film impregnated into the veneer, wherein the natural wood composition veneer includes at least one fold defining a fold line, said veneer having generally planar first and second portions immediately adjacent said fold line, said first and second portions forming an acute angle relative to one another.

3. An article made of, or including, a molded natural wood composition veneer having curvature with respect to at least two perpendicular planes to define a concave and/or convex surface portion or portions, wherein the composition veneer includes a plastic film impregnated into the wood veneer from one side of the veneer; and wherein: the plastic film is a copolyester of terephthalic acid and a diol.

4. A method of attaching a real wood veneer to a substrate without an added adhesive, comprising the steps of:
   (a) providing a wood composition veneer including a wood veneer having a thickness of from about 0.003 inch to about 0.01 inch, and a plastic film impregnated into at least one side of the wood veneer;
   (b) heating the composition veneer to a temperature above the glass transition temperature of the plastic impregnating the wood veneer;
   (c) pressing the composition veneer against the substrate while the plastic impregnating the wood veneer is at a temperature above its glass transition temperature;
   (d) deforming the veneer
   (e) into a shape having a curvature with respect to at least two perpendicular planes.

5. A decorative article comprising:
   a base article having a convex substrate surface; and
   a natural wood composition veneer fused on one surface thereof to the convex substrate surface, the natural wood composition veneer including a plastic film impregnated into the veneer on a side opposite the side fused to the convex substrate surface, said natural wood composition veneer defining a convex outer surface, wherein
   at least a portion of said natural wood composition veneer defines at least a portion of a spherical shape.

* * * * *